Patented Nov. 14, 1944

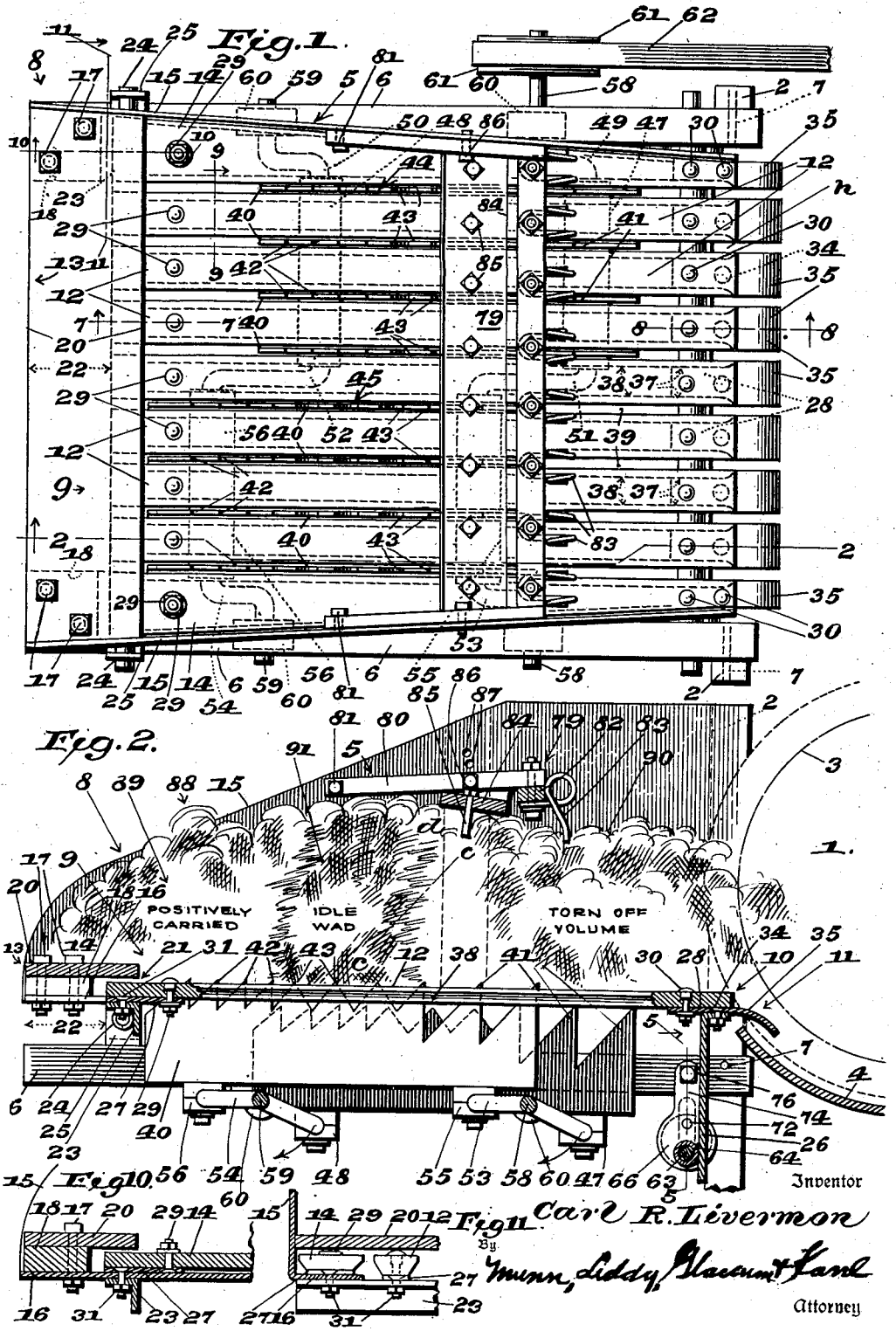

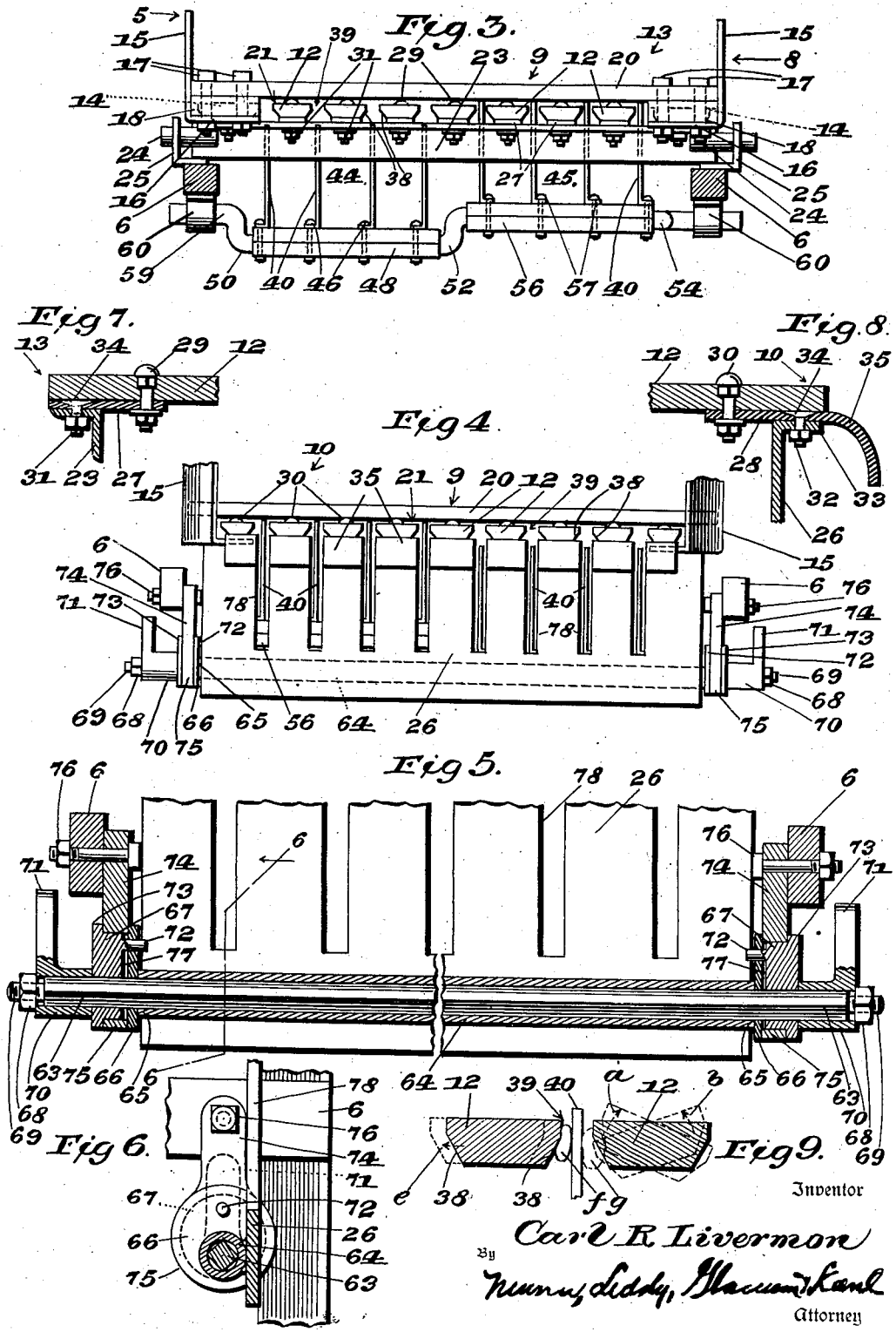

2,362,492

UNITED STATES PATENT OFFICE 2,362,492

FEEDER

Carl R. Livermon, Roxobel, N. C.

Application August 11, 1941, Serial No. 406,390

15 Claims. (Cl. 130—1)

This invention relates to improvements in feeders for threshing machinery, a particular purpose herein being to improve the feeder disclosed in an application for patent filed by Carl R. Livermon Feb. 25, 1941, Serial No. 284,792, now Patent 2,256,681, granted September 23, 1941.

The feeders involved herein as well as in the last-named application have the common concern of enabling an expeditious and orderly introduction of vegetation into the feed throat of a threshing machine. The particular vegetation in mind comprises peanut vines and although consistent reference is herein made to the latter, it is to be understood that the feeder is not confined to handling peanut vines but to the contrary is adaptable to analogous kinds of vegetation.

The time-honored practice of hand labor is to fork up volumes of vine material onto the feed table of the thresher, reliance usually being put on another attendant to push the material into the feed throat. Due to a lack of uniformity both in forking up volumes of the vine material onto the feed table as well as pushing said volumes into the feed throat, the operation of the threshing machine becomes spotty. At times quantities of material will pass the revolving picking cylinder in such volumes as to threaten to choke its operation, while at other times the volumes passing through will be so sparse as to barely impose any load at all upon said cylinder.

Inasmuch as a uniform operation of the threshing machine is a factor desirable to be achieved, the instant feeder has been contrived as a distinct improvement toward insuring that end, and moreover, maintaining the level of efficiency which its construction has reached during the handling of all conditions of the vine material as encountered in the field, whether wet, dry, dense or loose.

Having the latter conditions of vine material in mind one can readily visualize the types of response to which the feeder must be capable. To make this plain, it is readily understandable that when volumes of dense vine material are forked onto the feed table there could be a tendency toward choking the mechanism of said feed table even prior to said material reaching the feed throat of the thresher. In order to prevent that possibility the instant feed table is made up largely by a series of slats which are not inaptly termed "torsional" slats.

This term is herein adopted to define the outstanding characteristic of said slats which consists of yieldable amounts which enable said slats to twist in any lateral direction in response to any quantity of material that might tend to choke the passageway between any given carrier blade and an adjacent pair of slats, said slats yielding to a pressure of the obstruction by responding in a twisting or torsional action that will let the heavy place in the vine material work through.

Associated with the foregoing torsional slats is a plurality of carrier blades which are divided into groups of such lateral expanse as to insure dropping the respective and superimposed portion of the vine mass onto the feed table for a cleaning action of the latter when the particular blade group in question has moved into a secreted position beneath the feed table, said carrier blades having an entirely new tooth configuration which is responsible for that control of the vine mass which is requisite for bringing about the tearing off of uniform volumes beneath the retarding device.

A contribution of no little importance toward the uniformity in tearing off material is the antichoking exits of the blade slots, said exits obviously being located next to the feed throat of the threshing machine. Said exits are so contrived that any material tending to clog the slots up to the limit of forward movement of the blades is expelled beyond the end of the slots onto certain lips or aprons which lap a contiguous edge of the concave. With this preamble in mind the objects of the invention are as follows:

First, to provide a feeder which in operation insures dependable regularity in tearing off volumes of material from an indiscriminately piled vine mass on the feed table of a threshing machine, to be fed into the feed throat of said machine.

Second, to provide a novel type of feed table which is composed of a plurality of elements capable of individually orienting themselves in lateral directions with respect to a system of carrier blades, in responding to the pressure of obstructions between said blades and elements and by said individual orientation to release the obstructions.

Third, to provide a feeder wherein the slots for the carrier blades are composed of spaced slats, all of which are mounted for individual sidewise and torsional action, thereby to allow individual orientation or adaptation of said slats to temporary obstructions occurring between the blades and slats and the resulting working out of said obstructions for the clearing of the slots.

Fourth, to provide a feeder composed of at least a pair of blade groups, operable in precise and invariable circular paths which are defined as slots between a plurality of separating slats in turn yieldably mounted so as to respond with torsional actions of variable amounts and to lateral displacement in response to obstructions occurring therebetween and the blades.

Fifth, to provide a feeder which embodies an improved type of carrier blade, consisting of variously styled toothed portions successively adapted to positively grip and carry the vine material forwardly, next to partially grip volumes of said material to more particularly temporarily sustain an idle wad of said material and finally to grip deeply and firmly into the material to insure tearing off a volume from beneath the retarding device and immediately in advance of the feed throat.

Sixth, to provide a feeder wherein the exits of the carrier blade slots are so made as to avoid choking.

Other objects and advantages will appear in the following specification, reference being had to the accompanying drawings, in which:

Figure 1 is a plan view of the improved feeder.

Figure 2 is a longitudinal section thereof taken substantially on the line 2—2 of Fig. 1.

Figure 3 is a rear elevation of the feeder.

Figure 4 is a front elevation of the feeder.

Figure 5 is a cross section taken on the line 5—5 of Fig. 2.

Figure 6 is a cross section taken on the line 6—6 of Fig. 5, illustrating the table adjustment more clearly in detail.

Figure 7 is a cross section taken on the line 7—7 of Fig. 1.

Figure 8 is a cross section taken on the line 8—8 of Fig. 1.

Figure 9 is a detail cross section taken on the line 9—9 of Fig. 1 particularly illustrating the yielding and torsional actions of the slats.

Figure 10 is a cross section on the line 10—10 of Fig. 1.

Figure 11 is a cross section on the line 11—11 of Fig. 1.

As brought out before, the improved feeder is herein adapted to a threshing machine commonly designated 1 (Fig. 2). This machine includes at least a pair of uprights 2 at what is herein known as the front end. Said machine also includes a revoluble picking cylinder 3 and the fixed concave 4. Neither the conventional teeth on the cylinder 3 nor concave 4 are shown herein, but it will be understood that such teeth necessarily appear in the threshing machine, their obvious purpose being to tear the vines and so cause a separation therefrom of the peanuts.

Mounted on the framing of which the foregoing uprights 2 are parts, is a feed hopper 5. The latter includes a pair of beams 6 which are secured at 7 to the uprights 2. In practice the beams 6 are braced from said uprights so as to insure a perfectly rigid foundation for the feeder commonly designated 8. This feeder consists of the table 9, and it is composed of a plurality of slats (Fig. 1) spaced apart. The discharge end 10, herein known as the front end of the feed table, terminates in close proximity to the cylinder 3, and thereby defines a part of the feed throat of the cylinder.

The slats of which the feed table 9 consists are designated 12. By preference they are composed of wood, but this is not an inescapable requirement because it is conceivable that the slats could be made of some other material and still carry out the underlying principle thereof which, as indicated above, is to adapt them to a yielding or torsional action during the operation of the feeder 8. Most of the slats 12 are composed of parallel-sided members, the group of which is flanked by side slats 14 which are distinguished from the slats 12 by flaring toward the rear end 13. However, said side slats 14 are essentially the same as the center slats 12, being mounted for lateral and torsional movement. The table construction includes the sides 15 which are bent under to provide flanges 16 (Figs. 3 and 11) on which the side slats 14 rest and are secured for lateral movement in the manner presently explained. Bolts 17 are used to secure a cross board 20 to said flanges through interposed spacers 18 (Fig. 10). The purpose of the spacers 18 is to support the cross board 20 at a sufficient altitude to provide a space 21 between the cross board and the contiguous tops of all of the slats. Said cross board overlaps the ends of the slats (Fig. 1) and thus limits the torsional action of the slats 12 (arrows a and b, Fig. 9) so that said slats may not be twisted excessive amounts and thus open the possibility of prematurely rupturing their flexible end mounts. The slats 14 are also subject to some torsional movement which, however, is also limited by the cross board 20. The cross board 20 also provides a ledge across which the mass of vines is conveniently forked without the undesirable possibitlity of ever striking the rear ends of the slats 12, 14 and possibly splitting them.

In furtherance of the latter purpose, it is seen in Fig. 2 that the cross board 20 is spaced an appreciable distance at 22 from the rear ends of the slats 12, 14. Only a portion of the cross board 20 overlaps said rear ends, as already pointed out, thus converting the spaced portion 22 into a guard in which respect said portion functions because of its being spaced beyond the rear ends of the slats.

An angle iron 23 supports the entire rear end of the feed hopper 5 and it also provides a part of the pivot on which said hopper is adapted to be swung up and down in limited amounts. For this purpose short tubes 24 are welded or otherwise secured to the ends of the iron 23 in such relationship as to project therebeyond and form trunnions. These trunnions are rested in holes formed in brackets 25. Said brackets are secured in upstanding relationship to the beams 6, thus completing a hinge or pivot on which the hopper can be swung, as stated.

At their forward ends the side slats 14 are narrowest (Fig. 1) as are also the flanges 16 which underlie them. These forward ends are yieldably secured to a head plate 26 in common with the slats 12, in a manner identical with the securement of the rear ends of all of the slats to the iron 23. Since the slats 12, 14, are of primary importance, attention is now directed to the means by which the yielding of said slats is accomplished.

Flexible mounts 27 and 28 (Figs. 7 and 8) are provided at the rear and front ends of each slat 12. Each mount is made of yieldable material. It may comprise stout leather or fabric, or laminations of canvas impregnated with rubber. These materials are merely suggestive and in actual practice will be substituted by any equivalent which will yield to torsional or laterally displacing movements of the slats, but not to forward and backward movements. The slats 12, 14, are not required to respond to forward and backward movements and, in fact, will not in ordinary operation be induced to perform such movements. But they will respond to lateral and/or displacing movements for which purposes the flexible mounts 27, 28, are well adapted.

Bolts 29, 30, secure the inner ends of the mounts 27, 28, to the undersides of the slats 12, 14 (Figs. 7, 8, 10 and 11). Other bolts 31, 32, secure other portions of the mounts 27, 28, respectively to the angle iron 23 and to a flange 33 along the top of the head plate 26. In the instance of each bolt 31 it is the rear end of the flexible mount 27 which is secured to the angle iron 23. But in the instance of the bolt 32 it is the medial portion of the flexible mount 28 which is secured to the flange 33. The bolts 31, 32, are characterized by having large thin heads 34. The purpose thereof is to extend their bearings over much larger areas of the mounts 27, 28, than if ordinary carriage bolts were used, thus prolonging the useful period of the mounts before the possibility of tearing out arises.

It is to be observed in Figs. 1 and 8 that the front ends of all of the slats 12, 14, are substantially flush with the front ends of the flange 33. It is also observed here that the mounts 28 are much longer than the mounts 27. It is only those portions of the mounts at both ends of the slats 12 between the sets of securing bolts which contribute toward the yieldability of said slats. The extra length of the mounts 28 extends beyond the front ends of the slats where they curve over in the form of lips or aprons 35. Said lips overlap the inner edge of the concave 4, and they may either stand clear of the concave superinduced by whatever inherent stiffness may exist in the mounts 28 despite their yieldability, or they may actually engage the concave which they are very likely to do under pressure of the vine mass entering the throat 11.

All of the lips or aprons referred to are designated 35 in Fig. 1, it being understood that all of the mounts 28 in the transverse series (Fig. 1) are of equal length. The confronting sides of said mounts are relieved at 37 in those portions thereof which come under the front ends of the slats, said reliefs 37 matching the undercuts 38 of the superimposed slats. The nature of these undercuts is plainly seen in Figs. 3, 4 and 9. Said undercuts comprise bevels along the longitudinal nether edges of the slats 12. They serve to enlarge the slots 39 which are defined by the spacing of the slats. The undercuts 38 provide each of the slots 39 with a downward flare and the purposes of this flare are first to facilitate the entrance of the carrier blades into the slots on their upward strokes in the event of any blade being slightly off center in respect to a slot, second to accentuate the amount of relief obtainable between the blade and slat for a given turning or torsional movement of a slat, third to facilitate the material which might occupy the slot between any one or more pairs of the slats.

Each of the slots 39 provides the zone of operation of a carrier blade 40. Each carrier blade is of a novel character in that it has a set of coarse teeth 41 at the front, a set of relatively fine teeth 42 at the rear and an intermediate set of teeth 43 which are more nearly fine in nature than coarse. The teeth 41, 42, are in the nature of saw teeth and they are pitched forwardly, that is to say, in the direction of feed toward the concave 4. The intermediate teeth 43, however, are in the shape of inverted V's. They are neutral in character, either aiding in forwarding when the resistance is normal or suspending the forwarding when the resistance is heavy. The purpose in making the teeth 41 coarse is to enable them to withstand the heavy duty of forcing the vine mass toward the feed throat 11 and at the same time tearing off volumes of it under the presently described retarding device (Fig. 2). The purpose of the relatively fine teeth 42 is to positively carry the vine mass forwardly. In this respect they accomplish a sort of a rear guard action. The positiveness with which the teeth 42 carry the vine mass forwardly is the effect of the forward pitch thereof. The teeth 43 also serve to carry the vine mass forwardly but they are not as positive in this respect as are the teeth 42.

In fact the inverted V formation of the teeth 43 enables them at times to slip under the vine mass without accomplishing any appreciable forwarding action. Such a time would occur when the volume of vine material over the coarse teeth 41 resists, to an excessive extent other volumes of vine material oncoming from the left. Under that circumstance the forwarding action of the teeth 42 would be momentarily suspended permissibly by the springiness and compressibility of the vine mass in the region over the teeth 43, the latter merely slipping under the mass as stated, without performig any apprecibale forwarding action.

The carrier blades 40 work in groups. These groups are generally designated 44 and 45. Each of the groups is shown to comprise four carrier blades 40. In actual practice three blades to the group may be enough. The use of less than three blades to the group would defeat an important purpose of the grouping. More than four blades might be used, but it has been demonstrated that the use of four blades to the group adequately serves the intended purpose which is as follows:

By using four blades to the group the result is to demarcate a potential table area of sufficient breadth to insure the gravitation of the superimposed portion of the vine mass to the table surface when the respective blade group disappears below the table 9. The idea of insuring this gravitation of the respective portion of the vine mass is to sweep the table during the forwarding action of the mass by the other blade group then in action above the table. If fewer than three blades were used to the group there would be an insufficient exposure of table area to insure the gravitation of the vine mass because the massed vine strands would cling together so tenaciously as to effectively bridge the sparse gap. Thus it will be understood that the blade groups may not be too narrow, but to the contrary, must be broad enough to delineate table surfaces of sufficient breadth to insure the gravitation of the mass first on one side and then the other as the respective blade groups move under the table surface, as well as to provide sufficient capacity to carry the weight of the material and to overcome the resistance to its forward progress set up by the retarding device, at the same time insures against cutting through the vine mass.

These blade group movements are accomplished in the following manner: The blades in group 44 are secured at 46 (Fig. 3) in upright positions upon bearing blocks 47, 48, which embrace the matching throws 49, 50, of a pair of two-throw crank shafts 51, 52. The other throws of said crank shafts are designated 53, 54, and they carry bearing blocks 55, 56 in the same manner as before. The bearing blocks 55, 56 have the carrier blades of the group 45 secured thereto at 57. The axial ends 58, 59 of the crank shafts 51, 52 are journaled in bearings 60 which in this instance are conveniently affixed to the beams 6. One of the crank shafts carries a pulley 61 which is adapted to be driven by a belt 62. In practice either crank shaft may be driven by some preferred equivalent.

By preference the throws of each crank shank 51, 52, are offset in respect to each other so that they stand as shown in Fig. 2. The extent of the offset is about 15° although the actual offset may be more or less. The underlying purpose of the offset is to prevent the throws of any pair of cranks from reaching dead center simultaneously. The pairs of cranks are bound to work in unison because of being connected by the blades of the two carrier groups.

The teeth of the latter are rendered more or less effective on the mass of vine material through the instrumentality of adjusting the feed table 9 up or down. The adjustment is a swinging adjustment which is obtained by moving the feed table on the previously mentioned pivot 24. The adjusting is done by manually turning a cross sectionally non-circular rod 63 (Figs. 5 and 6). This rod is turnably contained by a tube 64 which is welded to the head plate 26. Said tube is slightly longer at 65 (Fig. 5) than the head plate 26 is wide. The ends of the tube may thus be tightly abutted by each of a pair of face plates 66 without interference from the contiguous edges of the head plate 26. Said face plates obviously are carried by the rod 63 as also are eccentrics 67. The face plates 66 and eccentrics 67 are loose on the rod 63 so as to be capable of slight movement toward each other and relaxation away from each other respectively when pressure is applied and released.

This pressure is secured by nuts 68 on the threaded extensions 69 of the rod 63. Said pressure is transmitted to the eccentrics and face plates by the hubs 70 of handles 71 against which the nuts 68 are adapted to be driven. Each eccentric has a pin 72 or its equivalent on the inside by which the respective face plate 66 is carried. On the outside said eccentric has a flange 73 which bears more or less tightly against a hanger 74 in the circular rim 75 of which the respective eccentric is carried. Each hanger is suspended on a bolt 76 from the contiguous beam 6.

In practice the rod 63 is not necessarily made non-circular all the way. It may consist of a round rod with non-circular ends, or splines might be used at the ends of the round rod to slidably but non-turnably carry the plate, eccentric and hub assemblage 66, 67, 70. Also in practice it is not necessary to duplicate the handle 70 and turnable nut 68. The clamping arrangement thus afforded might be confined to only one end of the rod, but in either case the screwing home of a nut 68 will transmit the pressure through the hub 70 to the eccentric 67 and thence from the flange 73 to one side of the rim 75, driving the other side of the latter hard against the plate 66 while at the same time driving said plate into tight abutment against the end 65 of the tube 64.

It is observed in Fig. 5 that there is a space 77 between the body of the eccentric 67 and the face plate 66. The pressure is thus confined to the outer surfaces of the rim 75, thereby providing a tight clamping engagement between the tube 64 and hanger 74 at any setting of the eccentrics 67. Should it be desired to either raise or lower the head plate 26 the requirements are to loosen one or both of the nuts 68 and then shift one or both of the handles 71. The resulting turning of the eccentrics 67 inside of the strap 75 will raise the rod 63 in respect to the hangers 74 and thus elevate the front end (nearest the concave 4) of the feed table 9. Should the rod 63 be situated in a raised position due to a previous adjustment, the foregoing turning of the handles 71 would result either in a further raising of the front end of the feed table or a lowering thereof, depending on which way the turning is done.

It is observed especially in Fig. 4 that the head plate 26 is deeply slotted at 78. These slots are in line with the carrier blades 40. Their purpose is to provide for the clearance of vines so that said vines will not hang in the carrier blade slots 39 beyond the rear limits of access by said carrier blades. The purpose sought to be served here is to facilitate the movement of the final volume of vine material after being torn off by the coarse teeth 41, but when speaking of tearing off it is necessary to give consideration to a retarding device which is generally designated 79 (Fig. 2). This device has arms 80 which at their rear ends are pivoted at 81 to the hopper sides 15. The space between their forward extremities is bridged by a bar 82 which carries a plurality of spring fingers 83 on its nether side. Immediately behind the bar 82 is another bar 84 which carries a plurality of rigidly depending spikes 85. Up and down adjustments of the retarding device can be had by setting the pins 86 in any matching pair or series of holes 87.

The operation is readily understood. Special emphasis is laid herein first on the performance of the slats 12, second on the performance of the tooth-series of the carrier blades 40 and third on the specific adjustment represented by the turnable rod 63 and the clamping nuts 68. A mass of vine material 88 is forked onto the feed table 9 (Fig. 2). Said mass carries a fairly large amount of dirt with it but this dirt is disposed of through the slots 39 in the operation of the feeder 8, by the sweeping action of the vine mass. This sweeping action is capable of accomplishment because of the grouping of the carrier blades 40 as described in Patent No. 2,256,681.

As the blade groups 44, 45 traverse their orbital paths there will be a steady forward advancement of the vine mass 88. The relatively fine teeth 42 (Fig. 2) positively carry the portion 89 immediately thereabove forwardly on each active impulse. The retarding device 79 both holds the mass down so that there is no chance of the vine mass ever resolving itself into a local circulation, and at the same time provides a grip respecting which the coarse teeth 41 may acquire a purchase in tearing off a volume as at 90. The line of cleavage approximately lies on the plane c—c (Fig. 2).

In practice it has been discovered that a desirable advantage is secured by providing a rest area, so to speak, for the medial portion of the vine mass between the positively carried portion 89 and the torn volume 90. This rest area is occupied by what is denominated the idle wad 91. This wad is a temporarily dormant portion of the vine mass. It occurs immediately above the inverted V-tooth zone 43. Said teeth, it will be remembered, are capable of forwarding the mass, but when the pressure at d (Fig. 2) becomes excessive because of a perhaps slightly abnormal compacting of material in the volume 90, said inverted V teeth will slip under the idle wad 91, leaving the latter dormant until the pressure is relieved at d to an extent sufficient to let the wad 91 move forwardly in substitution of the volume 90 which by that time will have been fed into the feed throat 11.

It will be borne in mind that the vine mass 88 is a loose tangle of vine strands. It is subject to considerable compression and when compressed exhibits a certain tendency toward springiness. Consequently when the foregoing pressure at d (Fig. 2) becomes excessive the springiness of the vines in the wad 91 yields to the compressive action of the positively carried portion 89 avoiding any possibility of a maloperation which might otherwise result.

While the performance of the carrier blades 40 with their variously functioning teeth 41, 42 and 43 is of major importance herein, the performance of the torsional slats 12 is of equal importance. The presence of innumerable short strands of vines and other bits of vegetation, together with accumulations of soil, have a tendency to clog the slots 39, and in fact would clog the slots if definite provisions were not made to defeat that purpose. The slats 12 are suspended loosely to achieve the purpose of working out any accumulations in the slots. The loose suspensions afforded by the mounts 27, 28 (Figs. 7 and 8) are to be considered from the standpoint of yieldability. Said mounts provide for a torsional action of the slats 12, and this term is used to conveniently embrace the permissible three-way motion of the slats, first by a turn to the right (arrow a, Fig. 9) and turn to the left (arrow b) or a bodily displacement (arrow e, Fig. 9). The slats are not adapted to move either up or down, excepting to a minor extent, and not at all longitudinally. Referring to Fig. 9 one can readily see that an obstruction at f can displace the slat 12 laterally in the direction of arrow e, or if the obstruction is exceptionally large as at g it may bodily turn the slat (arrow a) each on the upstroke of the blade 40. If the obstruction should be of such a nature as to exert pressure on the slat on the down stroke of the blade then the slat would yield by a turning motion in the direction of arrow b.

In immediate support of the clearing function herein had by the torsional action of the slats 12, such antichoking function derived from the formation of the slot exits at the right of Fig. 1. The principle of said exits is that of an immediate expulsion of any material tending to load the slots up to the approximate position h (Fig. 1). The forward edges of the blades 40 are driven sufficiently close to the position h to pound out any obstruction, the result of eliminating the latter being facilitated both by the reliefs 37 and by the flexibility of the projecting lips 35.

The provision of said reliefs and flexible lips is virtually an extension of the function of the flexible table 9. To make this statement clear, the underlying purpose of making the slats 12 of the table 9 flexible, is to insure the working out of any obstruction collecting between the blades 40 and the sides of the slats. The function of the reliefs 37 and flexible lips 35 is to get rid of any obstruction that might tend to clog the slots 39 in the short zone immediately ahead of the blades.

By stopping the forward ends of the slats 12 at places only a short distance beyond the limit of forward movement of the blades 40 and then extending the table 9 in the form of the flexible lips 35 in a plane slightly lower than the top of the table (Fig. 2) the material is readily pushed iut into the open where all it has to do is to slide over the lips into the concave. Even though the lips are spaced apart the distance of the slots 39 there is but little chance of the material escaping through said spaces because the bulk of it is shed over the lips into the concave. As brought out before these lips are flexible and any material which should get between them cannot possible cause any binding because of their ability to yield and thus let the obstructions work out.

Various consistencies of the vine mass 88 will require more or less effective penetration of the carrier blade teeth into the undersides thereof. The securement of various results as far as vine mass penetration is concerned is simply achieved by adjusting the eccentrics 67 (Fig. 5). In view of the detailed description of the latter it is believed unnecessary to repeat the specific operation of the adjustment.

I claim:

1. A feeder comprising a slotted feed table, essentially thin, toothed carrier blades operable up through the slots, means securing multiple blades into at least two groups respectively for operation on opposite sides of the longitudinal center of the feed table, each group consisting of an approximate minimum of three blades, the actual numerical requirement being a factor directly related to the density of a tangled vine mass intended to be conveyed, thus to avoid cutting through the mass and at the same time delineate a table area for exposure by each inactive group, of sufficient expanse to let the superimposed mass drop into contact with the table, means to alternately reciprocate the blade groups to actuate the mass with a combined advancing and sweeping action, mass-retarding means fixedly stationed above the feed table, consisting of twin rows of successive spikes and spring fingers, said blades having coarse teeth grouped under the retarding means to confine major penetration of the mass to the locality of said means, and relatively fine teeth grouped in advance of the retarding means serving to carry said mass up to said means, said coarse and fine teeth having a vertical edge confronting the vine mass; and a set of inverted V-teeth situated intermediately of the coarse and relatively fine teeth and partially in advance of the field of operation of the coarse teeth for aiding in sustaining the mass but capable of slipping thereunder in the event of excessive resistance to the mass over the coarse teeth, the inverted V-teeth having both edges inclined to the vertical.

2. A feeder comprising a slotted feed table, essentially thin, toothed carrier blades operable up through the slots, means securing multiple blades into at least two groups respectively for operation on opposite sides of the longitudinal center of the feed table, each group consisting of an approximate minimum of three blades, the actual numerical requirement being a factor directly related to the density of a tangled vine mass intended to be conveyed, thus to avoid cutting through the mass and at the same time delineate a table area for exposure by each inactive group, of sufficient expanse to let the superimposed mass drop into contact with the table, means to alternately reciprocate the blade groups to actuate the mass with a combined advancing and sweeping action, mass-retarding means fixedly stationed above the feed table, consisting of twin rows of successive spikes and spring fingers, said blades having successive sets of coarse, neutral and relatively fine teeth, the coarse teeth being grouped under the retarding means to confine major penetration of the mass to the locality of said means, the relatively fine teeth serving to carry said mass up to said means, the coarse and fine teeth each having a vertical edge confronting the mass of vines, said neutral teeth having both edges inclined to the vertical and aiding in carrying the mass but primarily sustaining a superimposed wad of the mass in temporarily idle transit toward the retarding device in the event of excessive resistance to the mass over the coarse teeth.

3. A feeder comprising a slotted feed table, essentially thin, toothed carrier blades operable up through the slots, means securing multiple blades into at least two groups respectively for operation on opposite sides of the longitudinal center of the feed table, each group consisting of an approximate minimum of three blades, the actual numerical requirement being a factor directly related to the density of a tangled vine mass intended to be conveyed, thus to avoid cutting through the mass and at the same time delineate a table area for exposure by each inactive group, of sufficient expanse to let the superimposed mass drop into contact with the table, means to alternately reciprocate the blade groups to actuate the mass with a combined advancing and sweeping action, mass-retarding means fixedly stationed above the feed table, consisting of twin rows of successive spikes and spring fingers, said blades having successive sets of coarse saw teeth, inverted-V and consequently neutral teeth and relatively fine saw teeth, the coarse saw teeth being grouped under the retarding means to confine major penetration of the mass to the locality of said means, the relatively fine teeth being primarily active in gripping and carrying said mass toward said means, the coarse and fine teeth each having a vertical edge confronting the mass of vines, said neutral inverted-V teeth having both edges inclined to the vertical end aiding in carrying the mass but being adaptable because of the inverted-V shapes to slip under the immediately superimposed portion of the mass, performing idly in respect thereto during the temporary occurrence of excessive resistance to the mass over the coarse teeth.

4. In a feeder, at least one orbitally movable carrier blade having a toothed edge for gripping a mass of vegetation, at least one pair of slats at the sides of said blade, forming a part of a table and being spaced to provide a working slot for the blade, and a yieldable means supporting the slats, making them responsive with a torsional action in the event of the adherence of an obstruction in the slot, said yieldable means comprising a strap of yieldable material having one end secured to a slat and the other end secured to a part of the table.

5. In a feeder, at least one orbitally movable carrier blade having a toothed edge for gripping a mass of vegetation, at least one pair of slats at the sides of said blade, forming part of a table and being spaced to provide a working slot for the blade, and supporting means for the slats being yieldable in lateral directions thereby to relieve the slot of any obstruction, but resisting yielding in the longitudinal direction, said supporting means comprising a strip of yieldable material fixed at one end to an end of the slat, the other end of the strip being secured to an adjacent part of the table.

6. In a feeder, at least one orbitally movable carrier blade having a toothed edge for gripping a mass of vegetation, at least one pair of slats at the sides of said blades, forming part of a table and being spaced to provide a working slot for the blade, and supporting means for the ends of the slats, being laterally yieldable and twistable to yield to torsional movements of the slats in response to obstructions in the slot, but resisting yielding in the longitudinal direction, said supporting means including a strip of flexible material secured to each end of a slat, the other ends of the strips being secured to adjacent parts of the table.

7. In a feeder, at least one orbitally movable carrier blade having a toothed edge for gripping a mass of vegetation, at least one pair of slats at the sides of said blade, forming part of a table and being spaced to provide a working slot for the blade, and flexible mounts for the ends of the slats, being composed of yieldable material subject to twisting and lateral displacements to cause torsional responses in the slats to obstructions in the slot, but resisting yielding in the longitudinal direction, said flexible mounts having an end secured to an end of a slat, the other end of each mount being attached to an adjacent part of the table.

8. In a feeder, at least one orbitally movable carrier blade having a toothed edge for gripping a mass of vegetation, at least one pair of torsionally movable slats at the sides of the blade, forming part of a table and being spaced to provide a working slot for the blade, and a cross member fixed crosswise of the slats and being spaced thereabove to limit the torsional movements of the slats.

9. In a feeder, a plurality of slats forming a feed table, said slats being spaced from each other to provide slots, orbitally movable carrier blades working in the slots, said blades having toothed top edges to grip a mass of vegetation superimposed upon the table, flexible means supporting the ends of the slats for lateral yielding and twisting motions of the slats in response to obstructions accumulating in the slots, and a member fixed crosswise of one end of the slats and being spaced thereabove to limit said twisting motions of the slats.

10. In a feeder, a plurality of slats forming a feed table, said slats being spaced from each other to provide slots, orbitally movable toothed carrier blades working in the slots to grip and forward a mass of vegetation superimposed on the table, spaced flexible means providing the end mounts for all of the slats excepting a pair of slats at the sides of the feed table, said flexible means responding to the pressure of accumulations in the slots so that the spaced flexibly supported slats can respond with laterally yielding and twisting motions to expel the accumulations, and a board affixed to the side slats, being disposed crosswise of and spaced above one end of the flexibly mounted slats to limit the twisting motions thereof.

11. In a feeder, a head plate and an angle iron in spaced relationship to each other, a plurality of slats mutually spaced from each other to provide slots and to form a feed table, orbitally movable toothed carrier blades working in the slots to grip and forward a mass of vegetation superimposed upon the table, and spaced flexible means secured to the ends of the slats and respectively to the head plate and angle iron, providing yieldable mounts for all of the slats enabling said slats to respond to obstructions in the slots with twisting and laterally yielding motions, and a board disposed crosswise above one end of the slats to limit twisting movement of the slats and to provide a protection means for the ends of the slats therebeneath.

12. In a feeder, a head plate and an angle iron in longitudinally spaced relationship to each other, a plurality of slats mutually spaced from each other to provide slots and forming a feed table, orbitally movable toothed carrier blades working in the slots, strips of flexible material interposed between the head plate and one end of the slats and similar flexible strips interposed between the angle iron and the other end of the slats, and means securing said strips at their ends respectively to the head plate and to the slats in spaced relation at said one end and similar means securing the ends of the strips to the angle iron and the other ends of the slats, said flexible strips providing yieldable mounts allowing the slats to respond with torsional motions to obstructions in the slots.

13. In a feeder, a feed table including a plurality of slats, flexible supports for the ends of the feed table, resilient strips each of which is secured at one of its ends to a respective slat at the approximate ends of said slat, and means securing the other ends of the strips to said supports.

14. A feeder comprising a slotted feed table, toothed carrier blades operable upwardly through the slots and adapted to advance a mass of vines along the table to a threshing machine, mass retarding means fixedly stationed above the feed table and exerting pressure and a delaying action on an intermediate portion of the vines on the table to provide a relatively idle mass, each toothed carrier blade having a series of coarse teeth at one end adapted to be moved through the idle mass and force a portion thereof to the threshing machine, said blade having a series of relatively fine teeth at the other end for feeding incoming vines to the idle mass and inverted V-shaped teeth intermediate the coarse and fine teeth for moving a small amount of vines from the idle mass to the field of operation of the coarse teeth under limited pressure of the mass retarding means but incapable of causing movement of the vines under an increase of pressure, the front active edges of the first two sets of teeth being vertically disposed, the retarding means and the intermediate V-teeth cooperating to control the quantity of vines fed to the threshing machine by the coarse teeth, the other edges of the first two sets of teeth being inclined rearwardly, both edges of the intermediate set being inclined and presenting substantially a sliding surface to the mass of vines in both directions of movement.

15. In a feeder, a plurality of slats forming the feed table, having one of its ends adjacent to the feed throat edge of a concave, said slats being spaced from each other to provide slots, orbitally movable carrier blades working in the slots for moving a mass of vegetation on the table toward the concave, means for supporting the slats at one end of the feed table, spaced vertically disposed supports for the slats at the other end of said table adjacent the concave so that the ends of the slots adjacent the concave will be free of any obstructions above and below the slats, flexible means connecting the slats to the supports so that said slats may have a laterally yielding and twisting motion when obstructions tend to accumulate in the slots, the flexible means supporting the slats adjacent to the said concave extending beyond said ends and defining spaced flexible lips overhanging the concave edge and forming substantial continuations of the slats.

CARL R. LIVERMON.